(12) United States Patent
Helot

(10) Patent No.: US 12,111,464 B2
(45) Date of Patent: Oct. 8, 2024

(54) DISPLAY DEVICE FOR A MOTOR VEHICLE, METHOD FOR OPERATING A DISPLAY OF A MOTOR VEHICLE, CONTROL MODULE, AND MOTOR VEHICLE

(71) Applicant: AUDI AG, Ingolstadt (DE)

(72) Inventor: Jacques Helot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 104 days.

(21) Appl. No.: 17/298,293

(22) PCT Filed: Nov. 15, 2019

(86) PCT No.: PCT/EP2019/081474
§ 371 (c)(1),
(2) Date: May 28, 2021

(87) PCT Pub. No.: WO2020/109031
PCT Pub. Date: Jun. 4, 2020

(65) Prior Publication Data
US 2022/0035156 A1 Feb. 3, 2022

(30) Foreign Application Priority Data
Nov. 30, 2018 (EP) .................................... 18209436

(51) Int. Cl.
*G02B 27/01* (2006.01)
*B60K 35/00* (2024.01)
(Continued)

(52) U.S. Cl.
CPC .......... *G02B 27/0101* (2013.01); *B60K 35/60* (2024.01); *B60K 35/00* (2013.01);
(Continued)

(58) Field of Classification Search
CPC ........ G02B 27/0101; G02B 2027/0118; G02B 26/02; B60K 37/02; B60K 2370/1529;
(Continued)

(56) References Cited

U.S. PATENT DOCUMENTS

2014/0185129 A1* 7/2014 Kim ...................... G02F 1/1677
359/296
2015/0015518 A1 1/2015 Giesler et al.
(Continued)

FOREIGN PATENT DOCUMENTS

DE  10 2007 005 028 A1  8/2008
DE  102010055144 A1  6/2012
(Continued)

OTHER PUBLICATIONS

International Search Report (Form PCT/ISA/210); dated Jan. 13, 2020 in corresponding PCT Application No. PCT/EP2019/081474 (3 pages).
(Continued)

*Primary Examiner* — Douglas M Wilson
(74) *Attorney, Agent, or Firm* — STAAS & HALSEY LLP

(57) ABSTRACT

A display screen unit of a display device includes a display surface having a plurality of subareas, and a sight protection element configured to set a degree of transparency for each of the plurality of subareas. The display device further includes a back lighting module having at least one illumination element directed to the display screen unit, and a controller configured to set the display screen unit in a display mode, in which the sight protection element sets the degree of transparency for each of the plurality of subareas. The controller may be configured to provide a back light by
(Continued)

controlling the back lighting module based on a movement of the display screen unit from a stowed position to a deployed position.

18 Claims, 7 Drawing Sheets

(51) Int. Cl.
*B60K 35/22* (2024.01)
*B60K 35/29* (2024.01)
*B60K 35/53* (2024.01)
*B60K 35/60* (2024.01)
*G02B 26/02* (2006.01)
*B60K 35/81* (2024.01)
*G09F 9/302* (2006.01)

(52) U.S. Cl.
CPC ............. *B60K 35/22* (2024.01); *B60K 35/29* (2024.01); *B60K 35/53* (2024.01); *B60K 35/81* (2024.01); *B60K 2360/182* (2024.01); *B60K 2360/27* (2024.01); *B60K 2360/34* (2024.01); *B60K 2360/343* (2024.01); *G02B 26/02* (2013.01); *G02B 2027/0118* (2013.01); *G02F 2201/44* (2013.01); *G09F 9/3023* (2013.01); *G09G 2300/023* (2013.01); *G09G 2380/10* (2013.01)

(58) Field of Classification Search
CPC ...... B60K 2370/182; B60K 2370/1868; B60K 2370/28; B60K 2370/349; B60K 2370/52; B60K 2370/67; B60K 2370/152; B60K 2370/27; B60K 2370/34; B60K 2370/343; B60K 35/00; B60K 35/60; B60K 35/22; B60K 35/29; B60K 35/53; B60K 35/81; B60K 2360/182; B60K 2360/27; B60K 2360/34; B60K 2360/343; G02F 2201/44; G09G 2300/023; G09G 2380/10; G09F 9/3023

See application file for complete search history.

(56) References Cited

U.S. PATENT DOCUMENTS

| | | |
|---|---|---|
| 2015/0371579 A1 | 12/2015 | Yu et al. |
| 2017/0206831 A1 | 7/2017 | Schmittat |
| 2017/0310940 A1* | 10/2017 | Perdices-Gonzalez ..................... G09G 3/32 |
| 2018/0012562 A1 | 1/2018 | Mertens et al. |
| 2018/0157036 A1 | 6/2018 | Choi et al. |
| 2018/0188531 A1* | 7/2018 | Dubey ................. G02F 1/1368 |
| 2018/0231789 A1* | 8/2018 | Ng ......................... G09G 3/003 |
| 2019/0049653 A1* | 2/2019 | Nguyen ............... G02B 6/0078 |
| 2019/0299784 A1* | 10/2019 | Nakano ................ B60W 50/14 |

FOREIGN PATENT DOCUMENTS

| | | |
|---|---|---|
| EP | 18209436.7 | 11/2018 |
| FR | 3060137 A1 | 12/2016 |
| WO | WO 2014/008903 A1 | 1/2014 |
| WO | PCT/EP2019/081474 | 11/2019 |

OTHER PUBLICATIONS

Written Opinion (Form PCT/ISA/237); dated Jan. 13, 2020 in corresponding PCT Application No. PCT/EP2019/081474 (5 pages).
International Preliminary Report on Patentability (Form PCT/IB/373); dated May 25, 2021 in corresponding PCT Application No. PCT/EP2019/081474 (1 page).
Chinese Office Action dated Dec. 19, 2023 for Chinese Application No. 201980078330.3.

\* cited by examiner

DISPLAY DEVICE FOR A MOTOR VEHICLE, METHOD FOR OPERATING A DISPLAY OF A MOTOR VEHICLE, CONTROL MODULE, AND MOTOR VEHICLE

CROSS-REFERENCE TO RELATED APPLICATIONS

This application is a U.S. national stage of International Application No. PCT/EP2019/081474, filed on Nov. 15, 2019. The International Application claims the priority benefit of European Patent Application No. 18209436.7 filed on Nov. 30, 2018. Both International Application No. PCT/EP2019/081474 and European Patent Application No. 18209436.7 are incorporated by reference herein in their entirety.

BACKGROUND

Described herein is a display device for a motor vehicle, and a method for operating a display of a motor vehicle. The display device includes a display screen unit with a display surface, wherein the display screen unit includes a sight protection element. A display screen unit is defined as a component or construction part to display a graphical element (or "display element"), for example a graphical user interface ("GUI"). A sight protection element, that could likewise be called visibility protection element, visual protection element or switchable blind element, is defined as a structural element or component or member that is designed to set or adjust or regulate a degree of a transparency and/or a transmissivity of the display screen unit. In other words the sight protection element is likewise designed to set/regulate/adjust a degree of opacity. In other words, the sight protection element may be a screen that has segments that may be switched from opaque to transparent, and vice versa.

Transparent displays are known that are laminated with a second film or layer, e.g., with a switchable foil or switchable film, as well as displays that are designed to display in black or transparent or colourless.

German Patent Application No. 10 2010 038 159 A1 describes a display with a controllable transparency, whereby for increasing of a contrast a transparent, a light emitting display device for displaying image information on a side that is facing a viewer and a switchable filter to control the light entering though the display device on the far side of the viewer of the display device, are provided.

German Patent Application No. 10 2015 120 191 A1 describes a display device for optically displaying information, having at least one switchable, transparent display element for optionally displaying the information for a viewer looking into a viewing direction.

German Patent Application No. 10 2016 014 030 A1 describes a motor vehicle display device, including a transparent decorative panel, a display unit and at the front of the display unit is arranged a filter element, wherein the filter element is acted upon by at least a first voltage or a second voltage, wherein the filter element is in a transparent state at the first voltage in which the filter element for light emitted from the display unit is transparent, and the filter element is in an opaque state at the second voltage, in which the filter element is not transmissible to light emitted from the display unit.

The possibility of improving the degree of transparency is constantly increasing, and there are going to be transparent displays with a sufficient resolution for the automotive sector. Currently, there are displays available that can be set to a degree of transparency of about 50 to 60 percent, and have a resolution of about 40 dpi. Currently available switchable foils are equally not yet 100 percent transparent, and depending on the technology are about 50 percent to 90 percent transparent.

The end result of the laminated display thereby, in the worst case, can be 0.5 times 0.5=25 percent, and in the best case 0.6 times 0.9=54 percent. That might just be enough to produce an effect of transparency. However, there is a constant need of improvement in a way of more transparent displays.

SUMMARY

One or more aspects of the disclosure are directed to improving a contrast of a graphical element display on a display screen.

This may be achieved by the inventive devices and methods described herein. Advantageous embodiments are of the device and methods are further described herein.

Aspects of the disclosure are based on the idea to provide a display that is switchable to transparent for certain subareas, and a back lighting module including at least one illumination element that is directed to a display screen unit of the display, the display screen unit being the component that is constructed to display a graphical content. A perceived transparency of a switchable display is enhanced, and so is a contrast of a graphical element being displayed on the display screen unit. Further advantages are an increasing spatial perception, and a better visibility of the graphical element.

The display device for a motor vehicle includes a display screen unit with a display surface, wherein the display surface includes several predetermined subareas. The display screen unit includes a sight protection element that is configured to adjust and/or set for each of the subareas a respective degree of a transparency. In other words, the sight protection element is also configured to set for each of the subareas a respective degree of an opacity. The subareas, as a consequence, may also be considered as subareas of the display screen unit.

The display device may, for example, be configured as an electronic instrument panel or dashboard, and the display screen unit may, for example, include a so called smart glass display (polymer-dispersed liquid-crystal display, "PDLC-display") or intelligent display, or, alternatively, a combination of a transparent screen and/or a switchable film or switchable foil. For example, the display screen unit may be a combination of a monochrome and segmented LCD display (liquid crystal display), e.g., a black transparent LCD display, a TOLED (transparent OLED display) or other transparent display. Another example is a combination of a switchable foil or a switchable film, e.g. a black transparent switchable foil, and a TOLED display. The advantage of a TOLED is that the colours of a TOLED emit light, and black is passive, in other words no light is emitted. This leads to higher contrasts than, e.g., when using a TFT display that has backlight everywhere, or any other technology that allows to have a display layer that has self-lighting coloured pixels and a second layer with segments that may be either black or transparent.

The display device described herein also includes a back lighting module including at least one illumination element or light element that is directed to the display screen unit. The back lighting is disposed at a distance to the display. A back lighting module is a component or device for emitting light, and the at least one illumination element may be, e.g., a light emitting diode ("LED").

In other words, the at least one illumination element may be directed to at least one of the subareas. In case the back lighting module includes only one illumination element, the illumination element may be, e.g., configured to be pivoted to illuminate different subareas of the display screen unit. In case the back lighting module includes more than one illumination element, e.g. each of the illumination elements may be directed to a respective subarea of the display screen unit, or each of several groups of illumination elements may be directed to a respective subarea, or in between such that there are multiple illumination elements that can cover multiple subareas but, for example, not all subareas.

The display device described herein includes a control module that is configured to provide the display screen unit in a display mode, in which the sight protection element sets a degree of transparency for each of the subareas. In other words, the control module is configured to set a degree of transparency for each of the subareas independently.

The above mentioned advantages are enabled, and the above mentioned disadvantages are reduced or even overcome.

The sight protection element may optionally may be designed to be planar and to be arranged in a first display plane of the display screen unit. In this embodiment, the display screen unit further may include a planar, transparent screen element arranged in the further display plane of the display screen unit, and in the direction of a vision of a user positioned in front of the sight protection element, and may be arranged in a planar manner on the sight protection element. Thereby, the transparent screen element may, for example, be designed as a glass screen.

In an example embodiment, the control module may be configured to determine at least one of the subareas, on which a graphical element or display element is displayed, e.g. a graphical user interface. The control module may further be configured to change the degree of transparency of the at least one subarea that displays the graphical element, i.e. on the displaying subarea, whereby the degree of transparency of the at least one subarea that displays the graphical element is different compared to the degree of transparency of the remaining subareas, and to provide a back light by controlling the back lighting module to illuminate the remaining subareas. Thereby, the above mentioned advantages are further enhanced. For example, in order to further enhance the advantages, the control module may be configured to change the degree of transparency of the at least one subarea that displays the graphical element only, and to provide the backlight by back lighting module to illuminate the remaining subareas only.

Optionally, the control module may be configured to change the degree of transparency of the remaining subareas to a transparent state, in which the remaining subareas have a degree of at least 25 percent of transparency. In addition to that, or alternatively, the control module may be configured to change the degree of transparency of the at least one subarea that displays the graphical element to a degree of transparency of less than 25 percent, for example to a fully opaque state. These variants contribute to further enhance the contrast, thus to further increase visibility of the displayed graphical element.

According to an example embodiment of the display device, the control module may be configured to provide the backlight by controlling the back lighting module to illuminate the remaining subareas, for example the remaining subareas only, depending on an extension or movement or displacement or shifting of the display screen unit from a stowed position, in which the display screen unit is stowed into a trim panel of the motor vehicle, to a deployed position, in which the display screen unit is in the display mode. In other words, the control module may be configured to detect whether the display screen unit is moved or displaced or shifted from a stowed position to a deployed or extended position, or from a deployed position to a stowed position, and may deactivate the back lighting module depending on such predicted movement or displacement or shifting. Advantageously, the back lighting is thus controlled depending on whether a user intends to use it or not. Especially when driving, a passenger in the motor vehicle does not have to care about switching on or switching off the back lighting manually.

For example, the back lighting module may include a rod and/or a matrix and/or a surface on which the at least one illumination element is arranged, for example wherein the back lighting module includes several rods with at least one illumination element on each of the rods. Advantageously, the rod or rods may be configured to extend in a same or similar direction than the display screen unit. In other words, the rod or rods may be parallel or substantially parallel to an extension of the display screen unit. Since the back lighting module may be mounted on a back side of the display screen unit from a user's point of view, such a spacious arrangement provides a better configuration for illuminating the display screen unit or parts of the display screen unit. With such an arrangement, consequently, more subareas of the display screen unit may be illuminated independently by the back lighting module.

The back lighting module may include more than one group of illumination elements, whereby each of the groups of illumination elements may be directed to a subarea of the display screen unit. In other words, the back lighting module may be segmented, for example whereby each of the segments includes at least one illumination element. This allows more degrees of freedom with respect to illuminating a single subarea with different intensities.

Described herein is a method for operating a display device of a motor vehicle, wherein the display device is a display device of any one of the embodiments described herein. The control module performs a providing of the display screen unit in a display mode, in which the sight protection element sets or adjusts a degree of transparency for each of the subareas. The above mentioned advantages apply here as well. The control module also performs an operation of providing the back light by controlling the back lighting module to illuminate the remaining subareas, for example, the remaining subareas only. The advantages have already been discussed above.

According to an embodiment of the method, the control module may perform a determining at least one of the subareas, on which a graphical element is displayed. The control module may also perform a changing and/or adjusting the degree of transparency of the at least one subarea that displays the graphical element, i.e. the displaying subarea, for example the degree of transparency of the at least one subarea only, whereby the degree of transparency of the at least one subarea that displays the graphical element is different compared to the degree of transparency of the remaining subareas. For example, the degree of transparency of the at least one displaying subarea displaying the graphical element is lower than the degree of transparency of the remaining subareas, such that the at least one subarea displaying the graphical element is opaque compared to the remaining subareas.

The control module may perform a changing or setting or adjusting of the degree of transparency of the remaining subareas to a transparent state in which the remaining subareas have a degree of at least 25 percent of transparency or higher. Additionally or alternatively, the control module may perform a changing of the degree of transparency of at least one subarea that displays the graphical element to an opaque state.

According to an example embodiment of the method, the control module may perform a providing of back light by controlling the back lighting module to illuminate the remaining subareas, for example the remaining subareas only, depending on a movement or extension of the display screen unit from a stowed position, in which the display screen unit is stowed into a trim panel of the motor vehicle, to a deployed position, in which the display screen unit is visible for a user and in the display mode. The control module may perform, for example, a detecting of an extension (or movement or displacement or shifting) of the display screen unit from the stowed position to the deployed position, and providing the back light depending on a result of the detection. The advantages of this embodiment have already been discussed above in connection with the display device described herein.

Described herein is a control module, which is configured to perform a method according to the described embodiments. For example, the control module may be designed as an electronic control unit (ECU) or as an integrated circuit. For example, the control module may include a processor unit, i.e. a component for data processing, e.g. a CPU. The optional processing unit may include at least one microprocessor and/or at least one microchip. The control module may optionally include a data storage, whereby the data storage may have stored a program code for performing the method described herein. Thereby, the program code is designed to cause the control module to perform any of the above mentioned embodiments of the method described herein when executed by the processing unit. The same advantages arise as already described above.

Described herein is a motor vehicle that includes the display device described herein. The motor vehicle may be designed as a passenger vehicle, for example.

For example, the display screen unit of the display device is a free standing or self-supporting one or a standalone display screen unit, respectively, in an interior space of the motor vehicle. The term "free-standing" is to be understood in a way that at least a front side and a back side of the display screen unit, as well as at three edges are not attached to a support or other component of the vehicle or of the display device. Applied to such kind of display device, the display device described herein provides different degrees of sense of spaciousness or spatial perception, and the possibility to see through the display on the road or on parts of the interior depending on the layout of the vehicle, depending on the selected subareas that are set transparent. For example, the display device may be planar or curved, or double curved (i.e. curved in two axes), or bent, or have a three dimensional shape.

Advantageous embodiments of the method described herein are to be regarded as advantageous embodiments of the display device, and the motor vehicle, described herein and vice versa.

Further advantages, features, and details derive from the following description of examples as well as from the drawings. The features and feature combinations previously mentioned in the description as well as the features and feature combinations mentioned in the following description of the drawings and/or shown in the drawings alone may be employed not only in the respectively indicated combination but also in any other combination or taken alone without leaving the scope of the disclosure.

BRIEF DESCRIPTION OF THE DRAWINGS

In the following, aspects and advantages will become more apparent and more readily appreciated from the following description examples, taken in conjunction with the accompanying drawings, of which.

DETAILED DESCRIPTION

Figure 1:
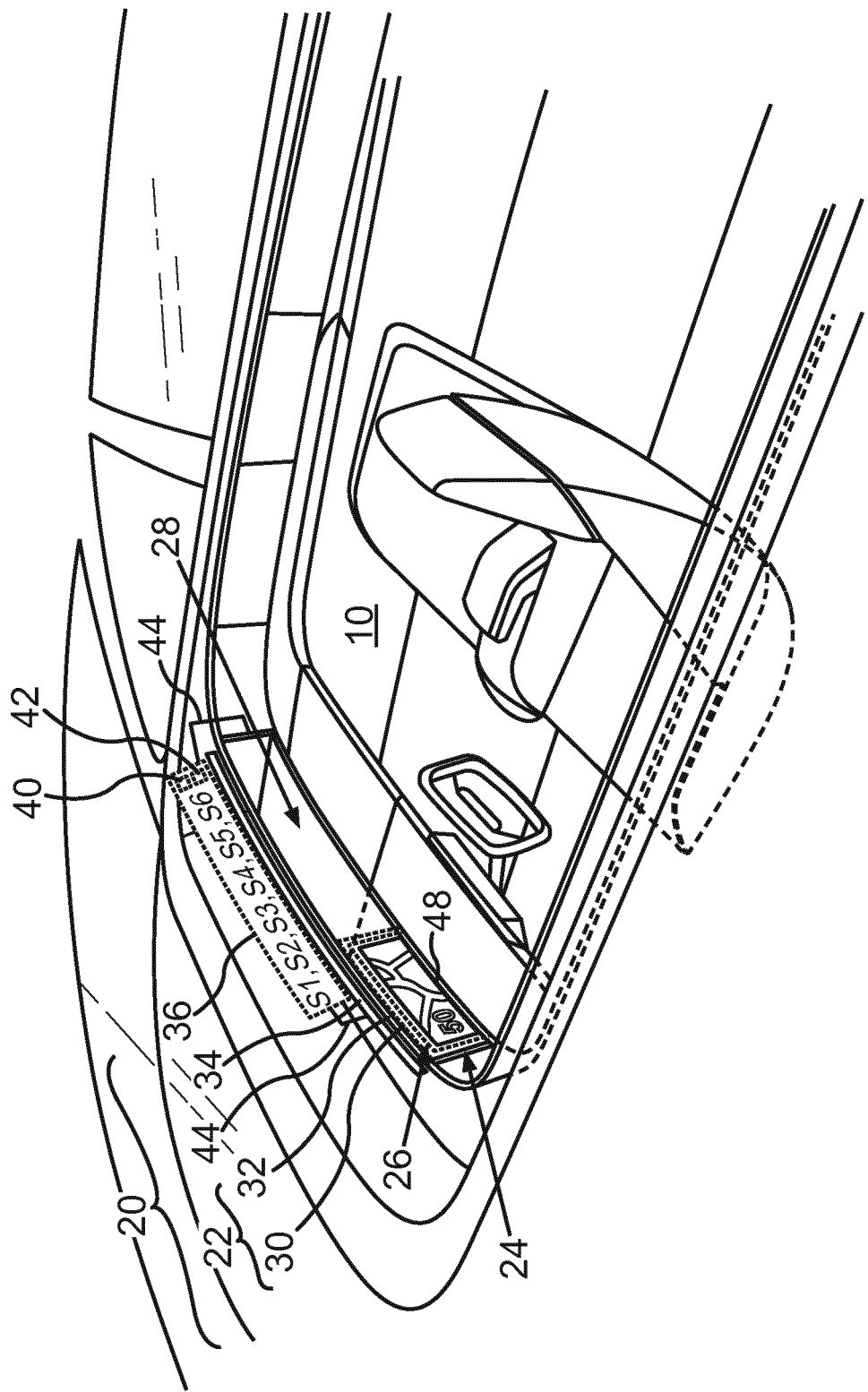
FIG. 1 is a schematic illustration of an example embodiment of the method described herein, and the devices described herein.

Reference will now be made in detail to examples which are illustrated in the accompanying drawings. In the drawings identical reference signs or characters indicate elements that provide the same function.

FIG. 1 illustrates the method described herein, and the display device 20 described herein. The display device 20 as displayed in FIG. 1 may be arranged in a motor vehicle 10, for example.

The display device 20 includes a display screen unit 22, wherein a display surface includes several predetermined subareas 24, 26, 28. Area 28 as shown in FIG. 1 may also be subdivided in smaller areas. The display screen unit 22 also includes a sight protection element 30. In the example of FIG. 1, the display screen unit 22, may, for example, include a planar, transparent screen element 32, for example an LCD display, a transparent light emitting display ("TOLED"), or a TFT display (thin-film display), whereby the display screen unit 22, for example the transparent screen element 32, is designed to display a graphical content in black and/or transparent, or to show all colors except the black while being relatively transparent.

The transparent screen element 32 may be planar, and be arranged in a planar manner on a planar designed sight protection element 30, for example a switchable foil or a switchable film, for example a PDLC film, e.g. a Gauzy film, or a segmented transparent LCD display, for example a segmented transparent monochrome LCD display, or a black segmented transparent monochrome LCD display, that may be laminated on the transparent screen element 32. A laminated display screen unit 22 has a very homogenous look and shows all colors including black. Furthermore, the black is not light emitting and the colors are light emitting, leading to a high contrast. Alternatively, the display screen unit 22 may, for example, be a smart glass display as known from related art.

The display screen unit 22 of the example of FIG. 1 is shown as a free standing one, i.e. a standalone display screen unit 22. The display screen unit 22 may, for example, be arranged at a distance to a windshield of the vehicle 10, so that the mode wherein some or all of the subareas 24, 26, 28 are set into a transparent state provide that a passenger of vehicle 10 may see through the display screen unit 22 and the windshield. Optionally, a front hood of the vehicle 10 may have a concave design, so that the user may see through the display screen unit 22 and over the concave hood onto the road. Alternatively, the display screen unit 22 may be located high enough so that with a regular car design a user may look through the display screen unit 22 on the road.

The display device 20 includes a back lighting module 34. In the example of FIG. 1, the back lighting module 34 may include several illumination elements (not shown in FIG. 1), and may include a rod or slot on or in which the illumination elements may be arranged. The one or more illumination elements are directed towards the display screen unit 22, that, when activated, illuminate one or more of the subareas 24, 26, 28, from a passengers view, from the back. An example distance between the illumination elements and display screen unit 22 may be, for example, in a range of 10 centimetres to 0.5 meter of display unit 22.

The display device 20 includes a control module 36, that may be designed as an electronic control unit. Control module 36 may optionally include a processor unit 40, and/or a storage unit 42.

The control module 36 is connected with the back lighting module 34, as well as with the display screen unit 22, via a respective data communication link 44, for example a wireless data communication link 44, e.g. a WIFI connection, or a wire-bound data communication link 44, e.g. a data bus of motor vehicle 10.

In the example of FIG. 1, the display screen unit displays a graphical element 48, for example a graphical user interface ("GUI"), a picture, a computer animation or a movie. When displaying the graphical element 48, control module 36 may switch the predetermined area 26 displaying the graphical element 48 into an opaque state, or a substantially opaque state of, e.g., less than 25 percent of transparency. Therefore, the control module 36 may switch the sight protection element 30 from a transparent state to the opaque state. The operation of providing the opaque state of a determined subarea 26 is depicted in the method as S1.

At the same time, control module 36 may adjust the sight protection element 30 to a higher degree of transparency in the remaining subareas 24, 28.

For adjusting the displaying subarea 26 into an opaque state, the sight protection element 30 may, for example, set all pixels of subarea 26 (for 100 percent opacity), or 80 percent of the pixels (for 80 percent opacity) to black, for example by rasterizing the pixels. As an example, a pixel may have an area 1 millimeter×1 millimeter, when using a monochrome and segmented LCD display. When using a monochrome and segmented LCD display, a binar transparency of, e.g., 95% or 10% may be achieved. When using a PDLC, the segments or pixels may, for example, have a size of 20×20 millimeters, and then a segment may for example have a transparency in a range of 10% to 95%, e.g., 95%, 90%, 85%, 80%, 75%, 70%, 65%, 60%, 55%, 50%, 45%, 40%, 35%, 30%, 25%, 20%, 15% or 10%.

In order to determine (S2) which of the subareas 24, 26, 28 is displaying the graphical element 48, control module 36 may provide a respective signal, since control module 36 also controls the displaying of graphical elements 48.

The other subareas 24, 28 may be adjusted to a state or condition or setting wherein they are transparent, i.e. more transparent than the subarea 26 that is displaying the graphical element 48.

The optional operation of determining at least one of the subareas 24, 26, 28, in which the graphical element 48 is displayed (S2) may include, e.g., that subareas 24, 28, as mentioned above, are determined to not display a graphical element 48. In addition to changing and/or adjusting the degree of transparency of subarea 26 to an opaque state as described above (S3), control module 36 may generate a control signal for back lighting module 34 (S4) which may be defined as a "back lighting signal". Back lighting module 34 may include a plurality of illumination elements (not shown in FIG. 1) for example, whereby some of the illumination elements may be oriented to subarea 24, some of the illumination elements oriented to illuminate subarea 26, and some of the illumination elements to subarea 28. In the example of FIG. 1, the back lighting control signal describes an activation of those illumination elements that are directed to subareas 24 and 28. For example, the back lighting control signal may describe that those illumination elements that are directed to the displaying subarea 26 must not be activated. The control module 36 may then transmit the back lighting control signal to the back lighting module 34, which may then activate all those illumination elements that are directed to one of the subareas 24, 28 not displaying graphical content. In other words, the control module 36 is setting the back light by controlling the back lighting module 34 (S5).

For example, control module 36 may at the same time generate a control signal and transmit the same to the display screen unit 22, for example the sight protection element 30, so that the sight protection element 30 adjusts the degree of transparency of the remaining subareas 24, 28 to a transparent state (S6).

Figure 2:
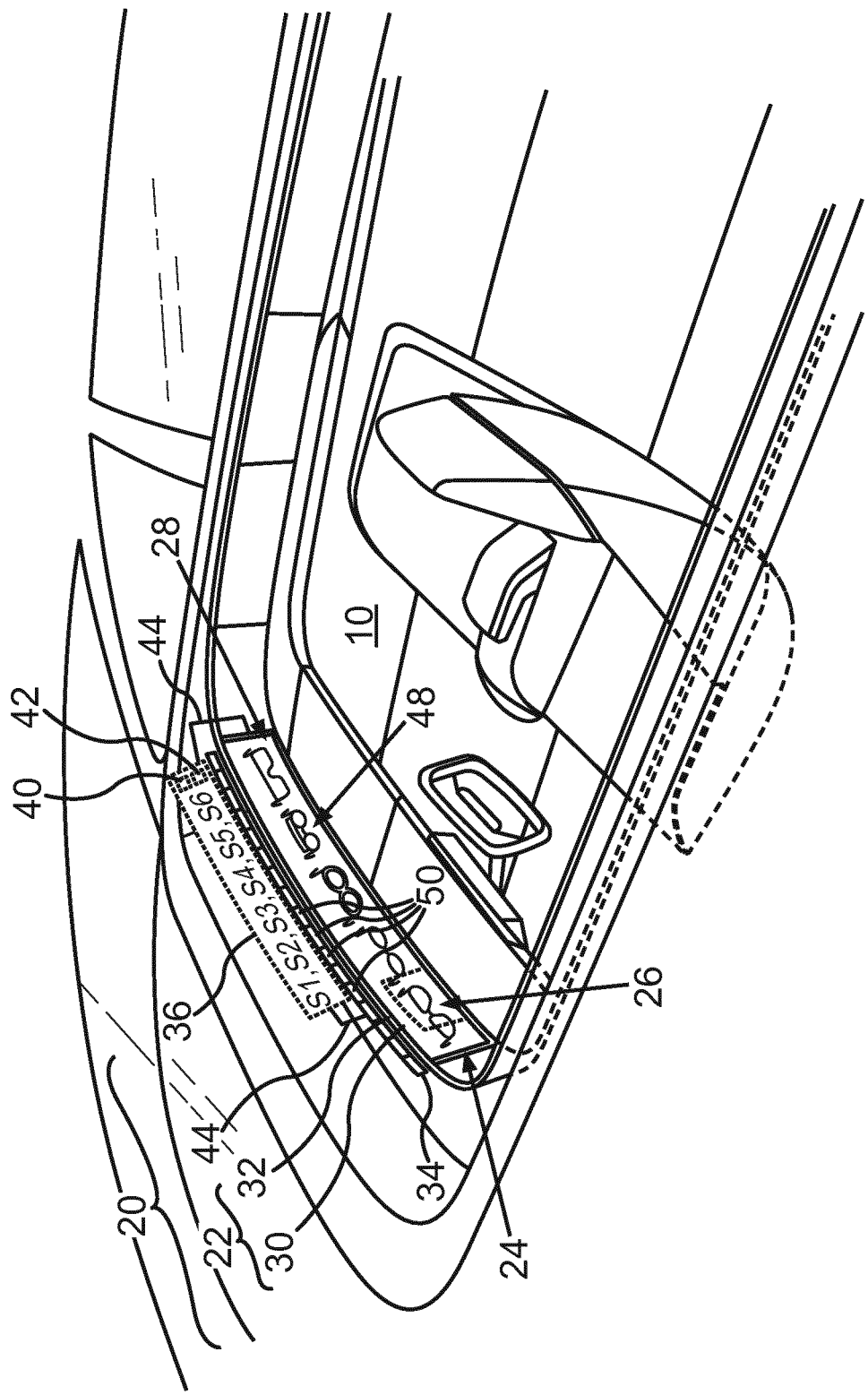
FIG. 2 is a schematic illustration of an example embodiment of the method described herein, and the devices described herein.

FIG. 2 shows another example, that may include the display device 20 according to FIG. 1 in a different display mode. In other words, the display device 20 of FIG. 2 may correspond to display device 20 of FIG. 1, wherein the differences in the settings are described below.

In FIG. 2, several illumination elements 50 of back lighting module 34 are shown whereby back lighting module 34 of FIG. 2 may be the same as the one of FIG. 1.

In the example of FIG. 2, all subareas 24, 26, 28 may display one or more graphical elements 48. For example, more than one graphical element 48 may be displayed whereby the plurality of graphical elements 48 may form one large graphical element 48. In the example setting of the display device 20 of FIG. 2 none of the illumination elements 50 may be activated, such that none of the subareas 24, 26, 28 are illuminated by back lighting module 34.

Figure 3:
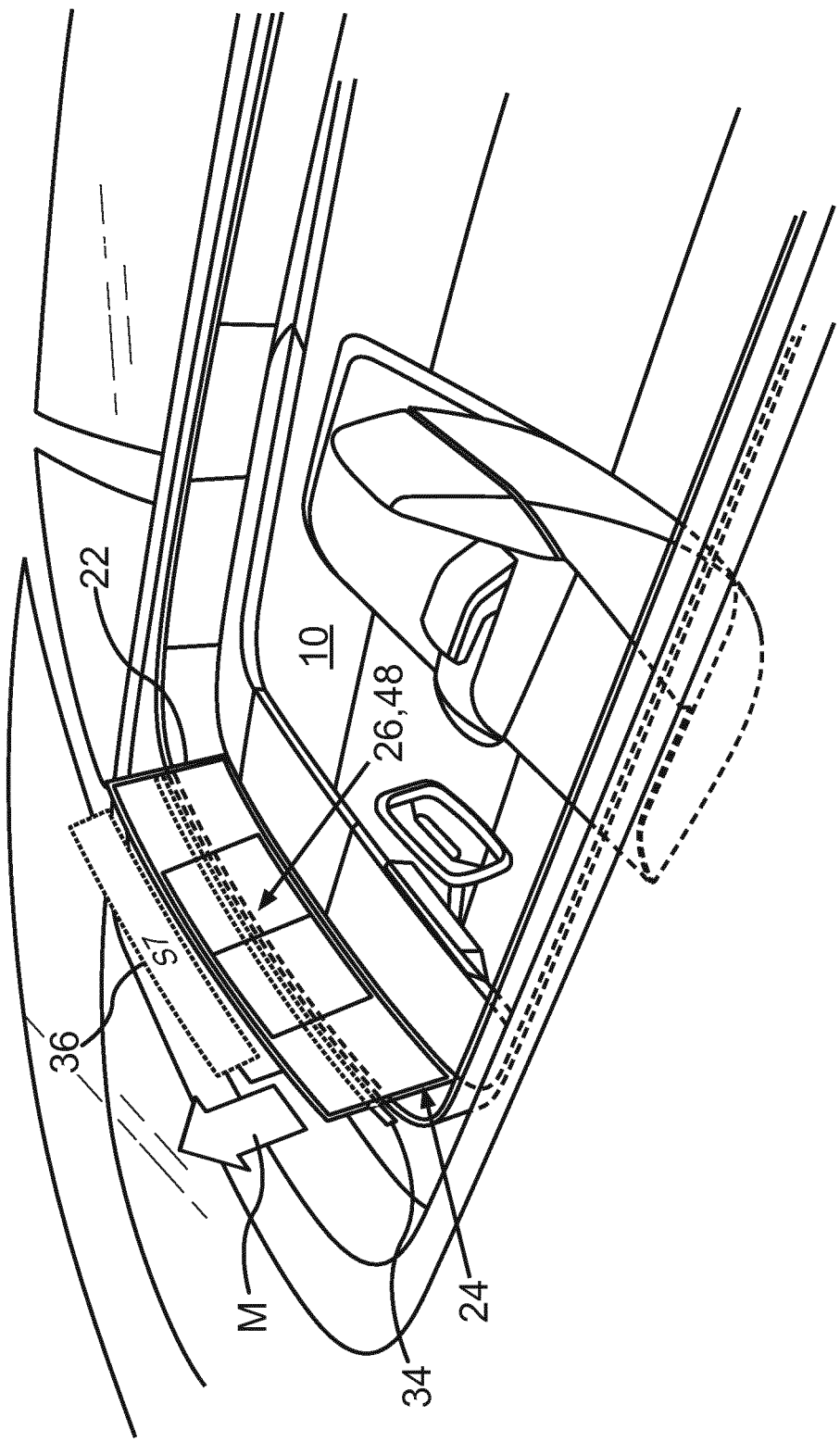
FIG. 3 is a schematic illustration of an example embodiment of the method described herein, and the devices described herein.
Figure 4:
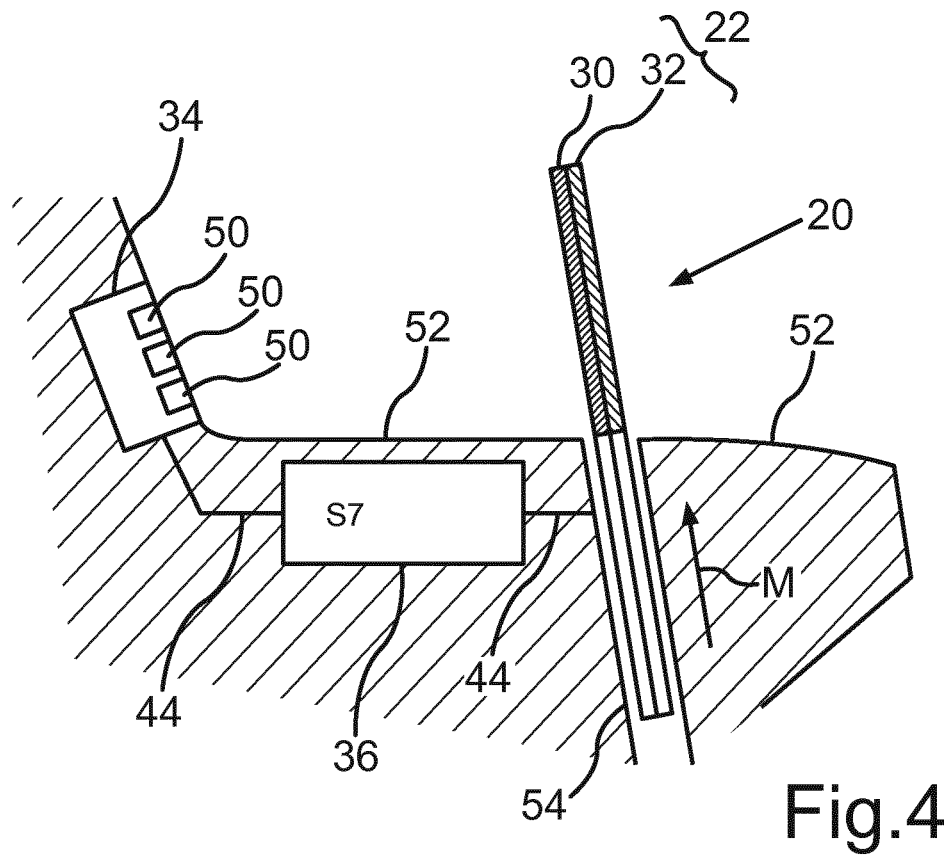
FIG. 4 is a schematic illustration of an example embodiment of the method described herein, and the devices described herein in a cross section.
Figure 5:
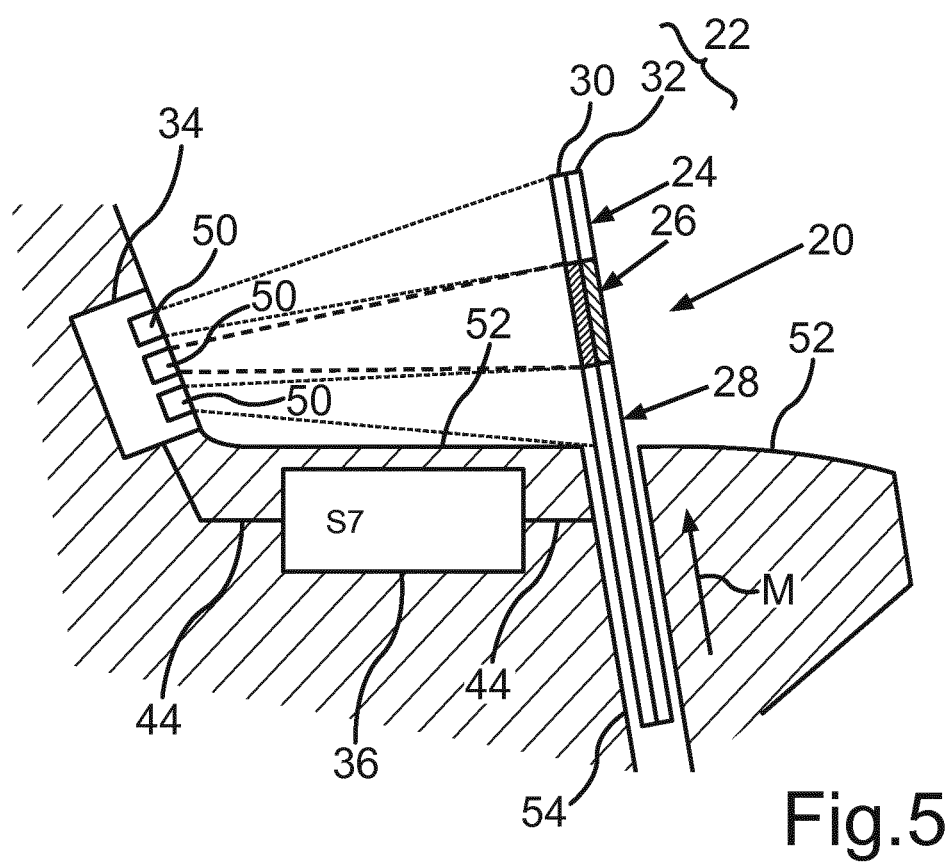
FIG. 5 is a schematic illustration of an example embodiment of the method described herein, and the devices described herein in a cross section.

FIG. 3, FIG. 4, and FIG. 5 describe an example embodiment, including the configuration of control module 36 to control the back lighting module 34 depending on whether display screen unit 22 is in a stowed position, i.e., for example stowed or hidden in a trim panel 52 of motor vehicle 10 or whether it is in a deployed position, such that the display surface is visible for a passenger of motor vehicle 10. In order to simplify the drawing of FIG. 3, and in order to provide a better overview, not all of the features of display device 20 are shown in FIG. 3, FIG. 4, FIG. 5, and also not all of the features shown are provided with reference signs. In general, the display device 20 of FIG. 3, FIG. 4 and FIG. 5 may however be one of FIG. 1 and/or FIG. 2, including the optional features and/or configurations as explained in the following.

For example, subarea 26 may be predetermined to display a movie (FIG. 3). For detecting that the display unit 22 is shifted from within a body of the example trim panel, control module 36 may, for example, receive and/or provide a signal from a user interface, that, e.g., may describe that a user of the display screen unit 22 activated the display device 20 by, e.g., a signal that is generated when a user is pushing a respective button. Alternatively, any sensor to detect a movement of display screen unit 22 may be applied, whereby suitable sensors are known to a skilled person.

Upon detecting that the display screen unit 22 is moved upwards (depicted by arrow M, S7), control module 36 generates the back lighting control signal and transmits the same to the lighting module 34. Likewise, the control of sight protection element 30 may be initiated depending on the movement M.

Likewise, a second back lighting signal may be generated by control module 36, in case a movement M is detected that brings display screen unit 22 back into the stowed position. The second back lighting signal may describe a shutting off of all illumination elements 50 of back lighting module 34, and/or shutting down the display screen unit 22.

FIG. 4 shows a view of an example trim panel 52 in a cross section. Alternatively to the previous examples, the example of FIG. 4 may include, that a back lighting module 34 may be constructed to include several rods or pockets with illumination elements 50 e.g., LEDs (light emitting diodes), which may be incorporated in the trim panel 52. If several rods and/or illumination elements 50 are arranged in different heights, a better segmented backlighting is enabled. If the back lighting module 34 includes pockets, the illumination elements 50 may be arranged in the pockets.

The display screen unit 22 may be positioned within a slot 54 of trim panel 52. The movement of display screen unit 22 may be performed by an electric motor or the like.

When moved out or deployed from a slot 54 (M), the providing of the back light by back lighting module 34 and, for example, the controlling of sight protection element 30, may be performed as described above.

For example, display screen unit 22 of FIG. 4 is shown in an activated state, in other words in a display mode wherein the display device 20 is active, and, e.g., only the upper half of display screen unit 22 is visible and activated. The upper part of the sight protection element 30 may be adjusted to an opaque state for subarea 26, whereby the lower part of sight protection element 30 may be adjusted to an inactivated state or transparent state. Likewise, only the upper part of transparent screen element 32 may be activated, for, e.g., showing a movie or other graphical content. In FIG. 4, all illumination elements 50 may be shut off.

FIG. 5 shows another embodiment, e.g. the display device 20 of FIG. 4, whereby only a stripe of display screen unit 22 is used. A graphical content may be displayed on the stripe only, and the respective part of sight protection element 30 may be set to black, i.e. opaque, whereas the remaining parts are set to be transparent. In FIG. 5 (and FIG. 4), the opaque area of the sight protection element 30 is shown hatched. The example transparent display screen element 32 of FIG. 5 may include TOLEDs that are activated in subarea 26 only.

Hence, in the example of FIG. 5, only the illumination elements 50 of, e.g., a top row of illumination elements 50, and a bottom row of illumination elements 50, may be switched on in order to back light subareas 24, 28, whereas a middle row of illumination elements 50 may be shut down/deactivated. Illumination elements 50 of the top row may illuminate subarea 28, and illumination elements 50 of the bottom row may illuminate subarea 24. For example, however, illumination elements 50 of the top row may illuminate subarea 24, and illumination elements 50 of the bottom row may illuminate subarea 28, so that the beams do not cross each other, which is advantageous in dusty air.

Figure 6:
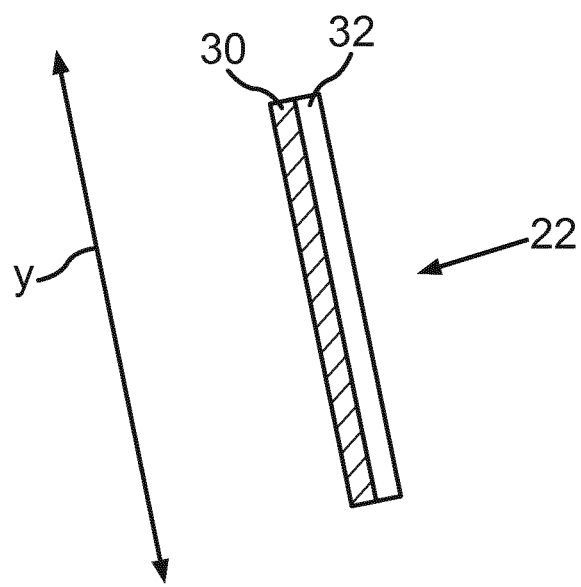
FIG. 6 is a schematic illustration of an example embodiment of the display screen unit described herein in a cross section.
Figure 7:
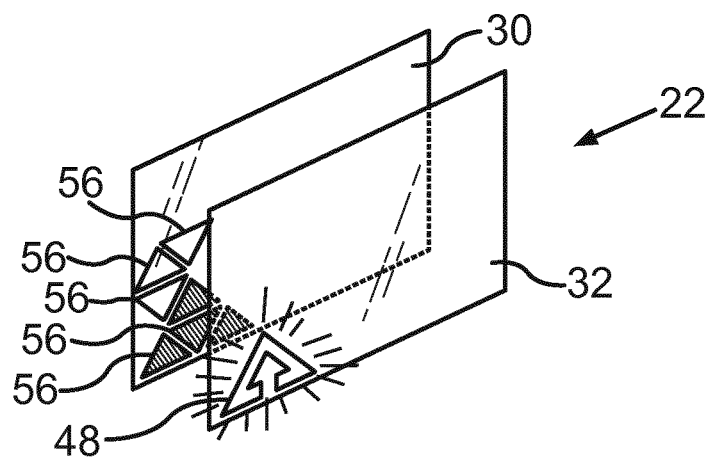
FIG. 7 is a schematic illustration of an example embodiment of the display screen unit described herein.
Figure 8:
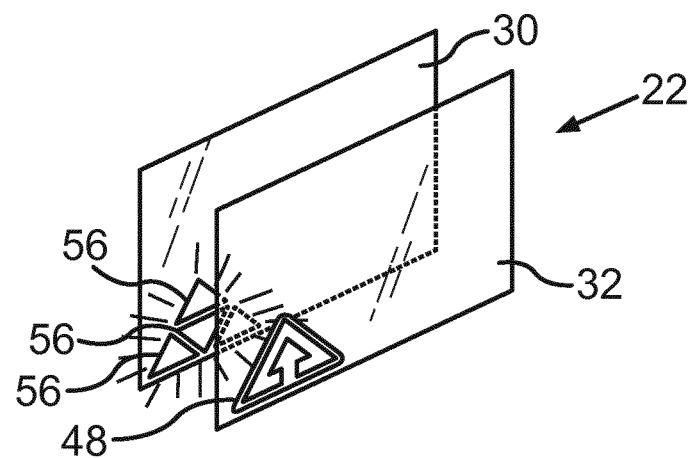
FIG. 8 is a schematic illustration of an example embodiment of the display screen unit described herein.

FIG. 6, FIG. 7, and FIG. 8 show the functionality of display screen unit 22 with respect to the switching between a transparent state and an opaque state. FIG. 6 shows the display screen unit 22 in a cross section, whereby, for example, the display screen unit 22 may include a planar, transparent screen element 32, and a sight protection element 30 that is also designed to be planar and to be arranged in a respective display plane of the display screen unit 22. Alternatively, the transparent screen element 32 and/or the sight protection element 30 may be curved, double-curved, or three-dimensional. The sight protection element 30 may, for example, be designed as a switchable foil or a switchable film, which may switch from opaque to transparent and vice versa, for example in several degrees or even continuously, for example in degrees with, e.g., the example PDLC foil, and/or binary with LCD monochrome and segmented LCD display.

The transparent screen element 32 may be transparent, for example. The cross section of FIG. 6 is one along a vertical axis Y of vehicle 10, or the display screen unit 22, respectively, when arranged in the vehicle 10, for example.

In FIG. 7, the graphical element 48 is presented as a logo for artificial intelligence in a triangular shape, for example. The display screen unit 22 may be composed of two layers 32 and 30. The display screen unit 22 is presented in FIG. 7 (and correspondingly also in FIG. 8) in an exploded view of the two layers 32 and 30. The first layer, the transparent screen element 32, may for instance be configured as a transparent OLED screen. This is configured to display at least one graphical element 48 for instance as a displayed graphic or a transparent diaphane (shape or figure). The example transparent OLED screen in the examples of FIG. 7 and FIG. 8 may be laminated with a sight protection element 30, which, for instance, may be configured as a switchable film. The switchable film may be electrically conductive and be subdivided into a plurality of predetermined portions 56. Shown here, a predetermined portion 56, e.g. a pixel or segment (i.e. a "large pixel"), may have the shape of a triangle, wherein all triangles may be composed to form the overall surface of the switchable film. The predetermined portion 56 alternatively may for instance have the shape of a square and/or a rectangle and/or a hexagon and/or a random geometrical figure that, for example, may cover a complete surface.

The individual predetermined portions 56 are capable of being switched by the control module 36 of the display device 20 so that an electrical voltage may merely be applied in one or a selection of the plurality of predetermined portions 56. Depending on the applied voltage the predetermined portion 56 changes from a transparent state into an opaque state. Therein a transparent state may have a transparency of at least 40% or at least 50% or at least 60%, or at least 90%, or more than 90%. An opaque state may have an opacity of at least 70%, or at least 80% or at least 90%, or more than 90%. The predetermined portions 56, which are switched by the control module 36 into an opaque mode, may be selected in such a way that these at least partly overlap with the transparent diaphane (shape or figure) displayed on the transparent OLED. Shown here are four triangles, each of which form a predetermined portion 56, switched into the opaque state so that the four triangles in composition form a triangular surface, which corresponds to the triangular surface of the transparent illuminated image on the transparent OLED screen. Thus, on the whole the display screen unit 22 a graphical element 48 may be recognized, wherein merely the background of the graphical element 48 is opaque. The remaining display screen unit 22 is transparent.

In FIG. 8, an alternative embodiment of the display screen unit 22 is shown. In the final result this displays the same graphical element 48 as in the embodiment shown in FIG. 7. The transparent screen element 32 and the sight protection element 30 of the display screen unit 22, however, may be configured differently. The organic light-emitting diodes may be arranged distributed across an overall surface of the transparent screen element 32. In this way equally in the sight protection element 30 portions 56 may emit, e.g., white light.

Alternatively to the shape of the display screen unit 22 as described above, display screen unit 22 may have other possible shapes. For instance, the display screen unit 22 may be curved in one direction, curved in two directions, bent or have a three-dimensional shape, or may have a combination of any of these shapes.

In another example, the visibility of the graphical element 48, e.g., a graphic user interface, to an outside of the vehicle 10 may be controlled by the sight protection element 30, e.g., by a switchable foil, a switchable film, or a switchable display. When a subarea 24, 26, 28, e.g., a segment of the display surface, is transparent, the graphical element 48 that lies on the transparent screen element 32 or on other display can become visible to the outside of the vehicle 10, dependent on the layout or of the vehicle 10 or the arrangement of the display screen unit 22 in the vehicle 10. For example, a graphical element 48 on the transparent screen element 32, e.g., a graphic user interface on a TOLED, may be visible from both sides. The sight protection element 30 may then act as a shutter.

Figure 9:
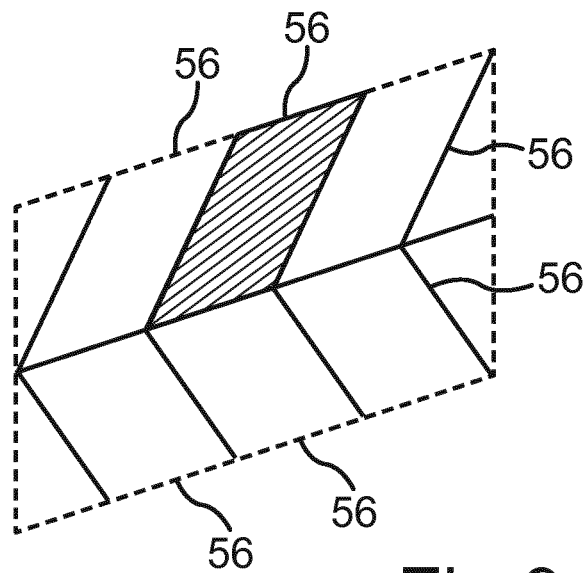
FIG. 9 is a schematic illustration of an example detail of a set of portions of the sight protection element.
Figure 10:
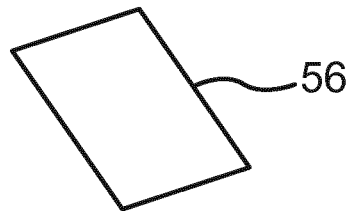
FIG. 10 is a schematic illustration of an example shape of a portion of the sight protection element.

FIG. 9 shows an example detail of a set of portions 56 of the sight protection element 30, wherein the shape of each of the portions 56 may be different compared to those shown in FIG. 7 and FIG. 8. In the example of FIG. 9, a portion 56 may have a rhomboid shape, i.e. shaped as an parallelogram. A single portion 56 is shown in FIG. 10.

Figure 11:
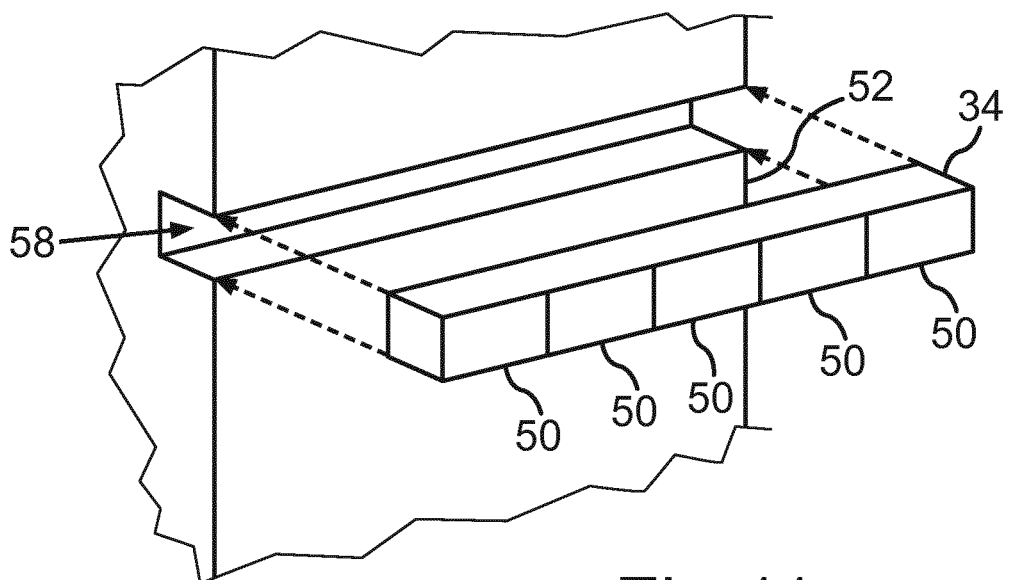
FIG. 11 is a schematic illustration of an example of the back lighting module in an exploded view.

FIG. 11 shows an alternative example of the back lighting module 34 in an exploded view. The back lighting module may include a rod or be shaped as a rod, and the rod may be segmented. One or more illuminations elements 50 may be arranged in each of the segments. For example, each segment or a group of segments of back lighting module 34 may be directed or oriented to one of the predetermined areas 24, 26, 28. In the example of FIG. 11, the back lighting module 34 may be arranged in a pocket or slot 58 of the vehicle's trim panel 52.

The examples describe a display device 20 with a transparent display, which may be switched partly to non-transparent (showing, e.g., a graphical user interface) with active backlighting, e.g. an LED backlighting, for supporting the transparency of the transparent portions.

The idea (cf. FIG. 1) is that the laminate of the transparent display screen element 32 and the example switchable foil or switchable film (or an extra black-transparent display) is back-lit, for instance, by LEDs divided into segments (by use of LED lamps very sharp contours and clear delimitations between a lit surface and unlit surface are possible to be achieved). If the graphical element 48, for instance a graphical user interface content, is small, only in subareas 24, 26, 28 where there is a graphical element 48, the segments are switched to opaque so that the graphical element 48 is well visible. This subarea 26 or portion is not back-lit by backlighting module 34, for instance by using LEDs, since the example OLED display is illuminated already and otherwise the black background would be too bright (the foil is not 100% light-tight/impermeable to light/opaque if irradiated from the back). The remaining subareas 24, 28 are switched to transparent so that the remainder of the display screen unit 22 is transparent. In the subareas 24, 28 where the segments are switched to transparent (by using, e.g., current technology between 25% and 54%) the example LED backlighting may for example precisely be directed at these subareas 24, 28 or portions so that these surfaces become brighter and appear more transparent.

Active portions or subareas 26 of the display screen unit 22 (cf. FIG. 1, FIG. 2) are not particularly backlit. Non-active subareas 24, 28 may for example be backlit by using the example LEDs oriented to the respective subarea 24, 28 so that the transparency appears increased.

If the display screen unit 22 is extended, the illumination may respond (cf. FIG. 3, FIG. 4). In the sectional view of FIG. 4 the situation is shown, in which in a y-section all subareas 24, 26, 28 are switched on. Then there is no extra backlighting in this section.

During piloted driving, for instance, a film can be shown. The subareas 26 behind the film are switched to opaque. The remainder is transparent.

FIG. 5 shows a Y-section, in which in the display some subareas 26 may have, e.g., a graphical user interface and two subareas 24, 28 may have no graphical user interface (i.e. have a certain transparency). The backlighting is directed exactly at these subareas 24, 28.

The brightness and direction of the lighting may for example be selected in such a way that it is not disturbing for the occupant. Possibly this can additionally be achieved by use of a shutter foil.

Advantages are, among others, that the transparent portions of the display ("display-on-demand") appear more transparent. The system also works with extendable displays, i.e., with or movable or displaceable or shiftable displays.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A display device for a motor vehicle, comprising:
   a display screen unit, including:
   a display screen element configured as one display surface dividable into a plurality of subareas which respectively display, and
   a sight protection element which is a switchable foil or a switchable film having a surface subdivided into a plurality of subareas of the sight protection element that correspond to the plurality of subareas of the one display surface so that a degree of transparency of at least one subarea of the sight protection element, of the plurality of subareas of the sight protection element, is switchable to be set for the at least one subarea of the sight protection element;
a back lighting module including at least one illumination element directed to the display screen unit; and
a controller configured to set the display screen unit in a display mode, in which the sight protection element is switched to set the degree of transparency for the at least one subarea of the sight protection element,
wherein the display mode includes the controller being configured to:
determine at least one subarea of the one display surface, from among the plurality of subareas of the one display surface, which displays a graphical element, and
change a degree of transparency of the at least one subarea of the sight protection element corresponding to the at least one subarea of the one display surface which displays the graphical element, from among the plurality of subareas of the sight protection element, so that a degree of transparency of remaining subareas of the sight protection element is different compared to the at least one subarea of the sight protection element which corresponds to the at least one subarea of the one display surface which displays the graphical element, and
control the at least one illumination element of the back lighting module to illuminate the remaining subareas of the sight protection element, from among the plurality of subareas of the sight protection element based on a movement of the display screen unit from a stowed position to a deployed position.

2. The display device according to claim 1, wherein the display mode includes the controller being configured to:
change the degree of transparency of the remaining subareas of the sight protection element to a transparent state, such that the remaining subareas of the sight protection element have a degree of transparency of at least 25%.

3. The display device according to claim 1, wherein the display mode includes the controller being configured to:
change the degree of transparency of the at least one subarea of the one display surface which displays the graphical element to a degree of transparency of less than 25%.

4. The display device according to claim 1, wherein in the stowed position the display screen unit is stowed into a trim panel of the motor vehicle, and in the deployed position the display screen unit is in the display mode and at least partially extended out of the trim panel.

5. The display device according to claim 1, wherein the back lighting module includes at least one of a rod, a matrix, or a surface on which the at least one illumination element is provided.

6. The display device according to claim 5, wherein the back lighting module includes a plurality of rods with the at least one illumination element on each of the plurality of rods.

7. The display device according to claim 1, wherein the back lighting module includes a plurality of groups, each of the plurality of groups including a plurality of illumination elements, from among the at least one illumination element, and
each group among the plurality of groups is respectively directed to a corresponding subarea among the plurality of subareas.

8. The display device according to claim 1, wherein the back lighting module is segmented into segments, and each of the segments includes at least one illumination element.

9. A motor vehicle, comprising:
a trim panel; and
the display device according to claim 1.

10. The motor vehicle of claim 9, wherein the controller is further configured to:
control the at least one illumination element of the back lighting module to illuminate the remaining subareas of the sight protection element without illuminating the at least one subarea of the one display surface which displays the graphical element.

11. The motor vehicle of claim 10, wherein in the stowed position the display screen unit is stowed into the trim panel, and in the deployed position the display screen unit is in the display mode and at least partially extended out of the trim panel.

12. A method of operating a display device of a motor vehicle, the display device including a display screen unit including a display screen element configured as one display surface dividable into a plurality of subareas which respectively display, and a sight protection element which is a switchable foil or a switchable film having a surface subdivided into a plurality of subareas of the sight protection element that correspond to the plurality of subareas of the one display surface, a back lighting module including at least one illumination element directed to the display screen unit, and a controller, the method comprising:
setting, by the controller, the display screen unit in a display mode, in which the sight protection element is switchable to set a degree of transparency for at least one subarea of the sight protection element, from among the plurality of subareas of the sight protection element,
wherein the display mode includes:
determining at least one subarea of the one display surface, from among the plurality of subareas of the one display surface, which displays a graphical element,
changing a degree of transparency of the at least one subarea of the sight protection element corresponding to the at least one subarea of the one display surface which displays the graphical element, from among the plurality of subareas of the sight protection element, so that a degree of transparency of remaining subareas of the sight protection element is different compared to the at least one subarea of the sight protection element which corresponds to the at least one subarea of the one display surface which displays the graphical element, and
controlling the at least one illumination element of the back lighting module to illuminate remaining subareas of the sight protection element, from among the plurality of subareas of the sight protection element, based on a movement of the display screen unit from a stowed position to a deployed position.

13. The method according to claim 12, wherein the display mode further comprises:
changing the degree of transparency of the remaining subareas of the sight protection element to a transparent state, such that the remaining subareas of the sight protection element have a degree of transparency of at least 25%; and/or changing the degree of transparency of the at least one subarea of the one display surface which displays the graphical element to an opaque state.

14. The method according to claim 12, wherein in the stowed position the display screen unit is stowed in a trim panel of the motor vehicle, and in the deployed position the display screen unit is in the display mode and at least partially extended out of the trim panel.

15. A controller for a display device of a motor vehicle, the display device including a display screen unit including a display screen element configured as one display surface dividable into a plurality of subareas which respectively display, and a sight protection element which is a switchable foil or a switchable film having a surface subdivided into a plurality of subareas of the sight protection element that correspond to the plurality of subareas of the one display surface, and a back lighting module including at least one illumination element directed to the display screen unit, the controller comprising:
   a memory configured to store instructions; and
   a processor configured to execute the instructions stored in the memory to:
      set the display screen unit in a display mode, in which the sight protection element is switchable to set a degree of transparency for at least one subarea of the sight protection element, from among the plurality of subareas of the sight protection element,
      wherein for the display mode, the processor is further configured to execute the instructions stored in the memory to:
         determine at least one subarea of the one display surface, from among the plurality of subareas of the one display surface, which displays a graphical element,
         change a degree of transparency of the at least one subarea of the sight protection element corresponding to the at least one subarea of the one display surface which displays the graphical element, from among the plurality of subareas of the sight protection element, so that a degree of transparency of remaining subareas of the sight protection element is different compared to the at least one subarea of the sight protection element which corresponds to the at least one subarea of the one display surface which displays the graphical element, and
         control the at least one illumination element of the back lighting module to illuminate remaining subareas of the sight protection element, from among the plurality of subareas of the sight protection element, based on a movement of the display screen unit from a stowed position to a deployed position.

16. The controller according to claim 15, wherein for the display mode, the processor is further configured to execute the instructions stored in the memory to:
   change the degree of transparency of the remaining subareas of the sight protection element to a transparent state, such that the remaining subareas of the sight protection element have a degree of transparency of at least 25%, and/or
   change the degree of transparency of the at least one subarea of the one display surface which displays the graphical element to an opaque state.

17. The controller according to claim 15, wherein the processor is further configured to execute the instructions stored in the memory to control the back lighting module to illuminate the determined at least one subarea based on the movement of the display screen unit from the stowed position, in which the display screen unit is stowed in a trim panel of the motor vehicle, to the deployed position, in which the display screen unit is in the display mode and at least partially extended out of the trim panel.

18. A display device for a motor vehicle, comprising:
   a display screen unit, including:
      a display screen element configured as one display surface dividable into a plurality of subareas which respectively display, and
      a sight protection element which is a switchable foil or a switchable film having a surface subdivided into a plurality of subareas of the sight protection element that correspond to the plurality of subareas of the one display surface so that a degree of transparency of at least one subarea of the sight protection element, of the plurality of subareas of the sight protection element, is switchable to be set for the at least one subarea of the sight protection element;
   a back lighting module including at least one illumination element directed to the display screen unit; and
   a controller configured to set the display screen unit in a display mode, in which the sight protection element is switched to set the degree of transparency for the at least one subarea of the sight protection element,
   wherein the display mode includes the controller being configured to:
      determine at least one subarea of the one display surface, from among the plurality of subareas of the one display surface, which displays a graphical element, and
      change a degree of transparency of the at least one subarea of the sight protection element corresponding to the at least one subarea of the one display surface which displays the graphical element, from among the plurality of subareas of the sight protection element, so that a degree of transparency of remaining subareas of the sight protection element is different compared to the at least one subarea of the sight protection element which corresponds to the at least one subarea of the one display surface which displays the graphical element,
      control the at least one illumination element of the back lighting module to illuminate the remaining subareas of the sight protection element, from among the plurality of subareas of the sight protection element corresponding to the changed degree of transparency of the at least one subarea of the sight protection element, and
      control the at least one illumination element of the back lighting module to illuminate the remaining subareas of the sight protection element without illuminating the at least one subarea of the one display surface which displays the graphical element.

* * * * *